Jan. 26, 1937.  E. S. HINELINE  2,069,186
COPYING CAMERA EQUIPMENT UNIT AND FILM MAGAZINE USED
THEREWITH BUT ALSO CONSTITUTING A DISTINCT UNIT
Filed Aug. 10, 1935  9 Sheets-Sheet 1
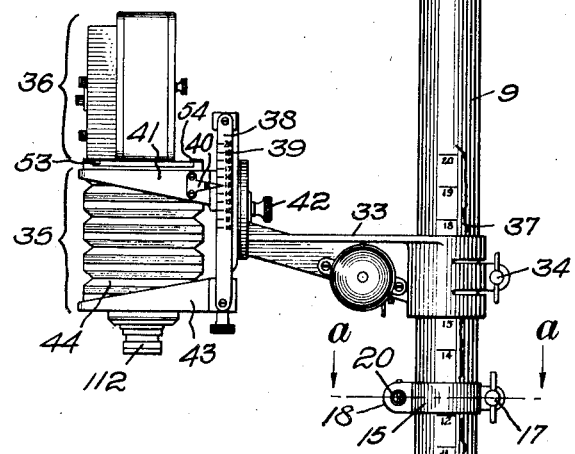
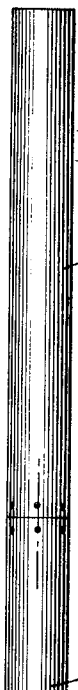
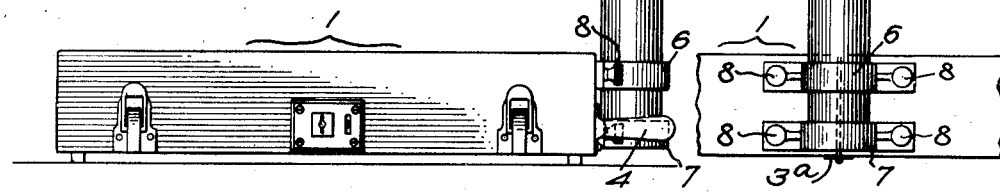
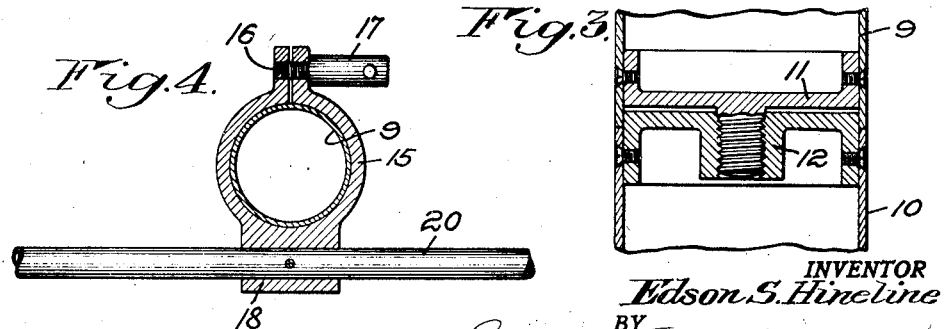
INVENTOR
Edson S. Hineline
BY
his ATTORNEYS.

Jan. 26, 1937.  E. S. HINELINE  2,069,186
COPYING CAMERA EQUIPMENT UNIT AND FILM MAGAZINE USED
THEREWITH BUT ALSO CONSTITUTING A DISTINCT UNIT
Filed Aug. 10, 1935  9 Sheets-Sheet 2
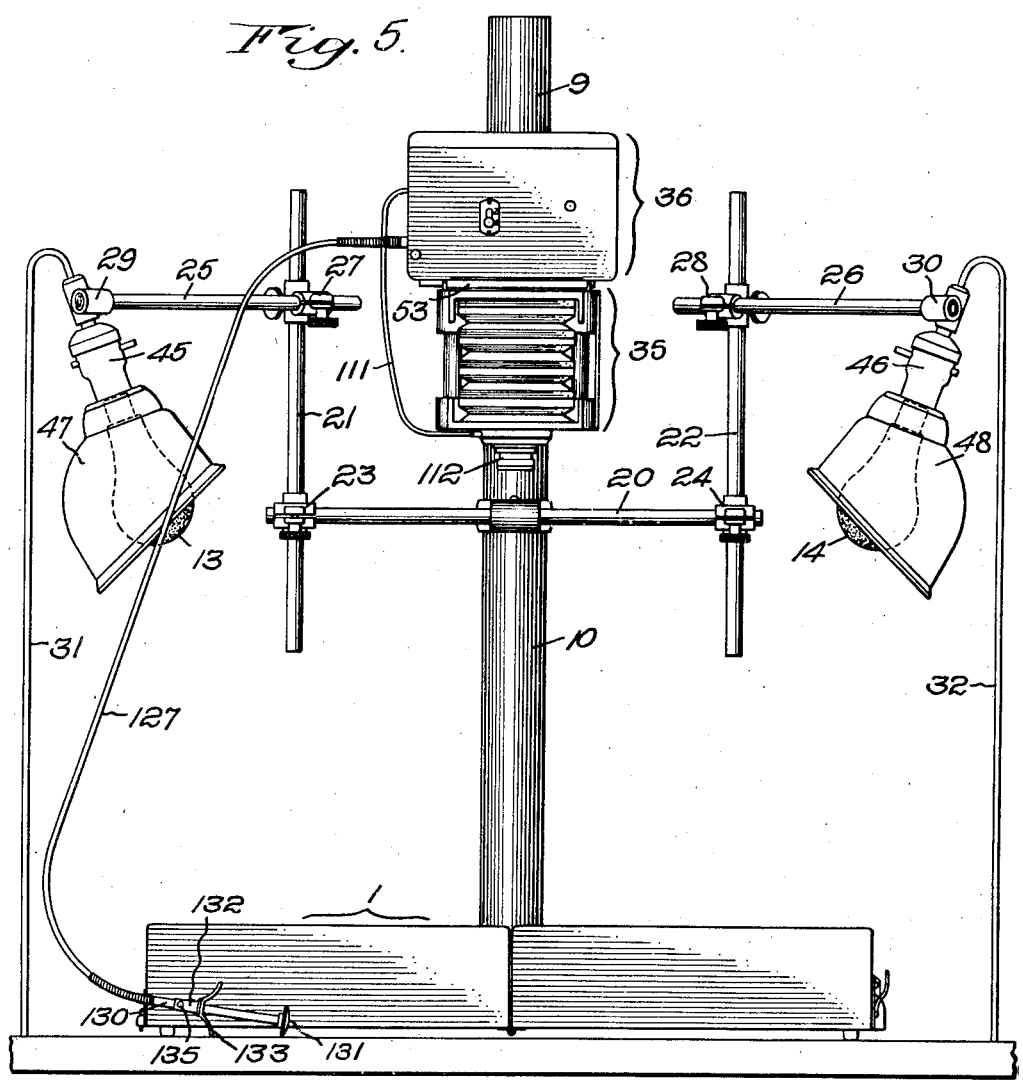
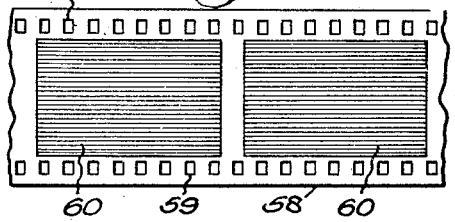
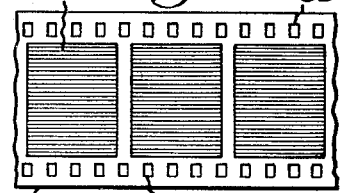
INVENTOR
Edson S. Hineline
BY
his ATTORNEYS

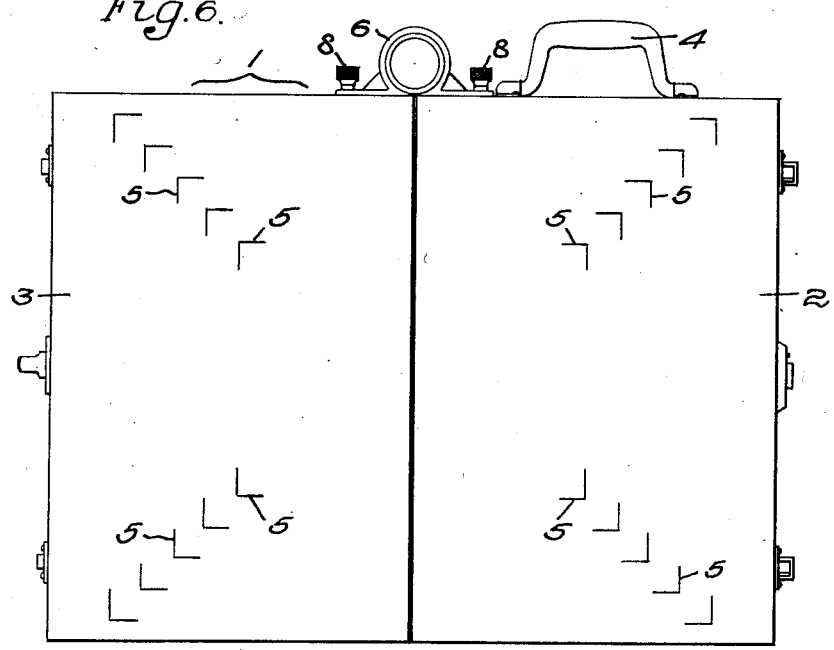
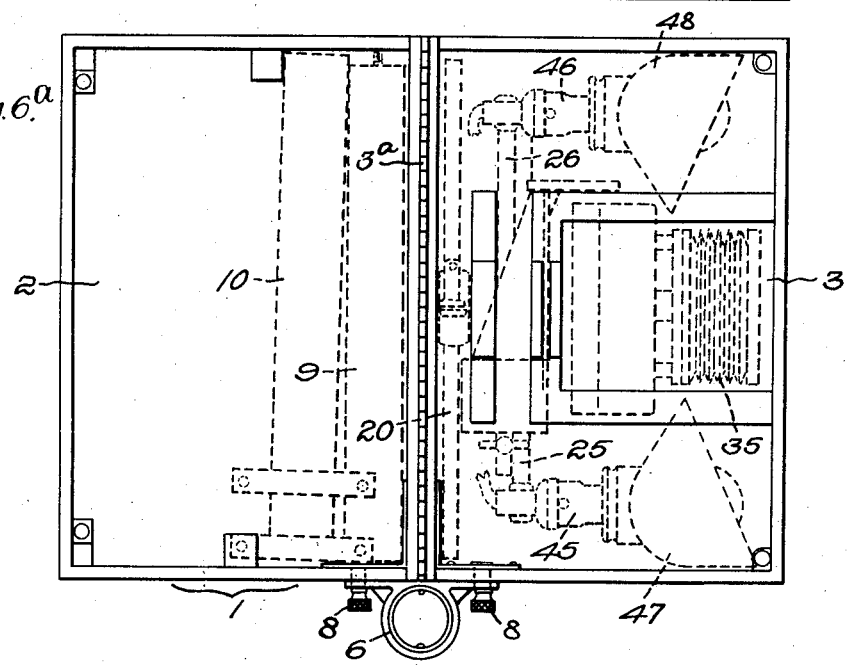

Jan. 26, 1937.  E. S. HINELINE  2,069,186
COPYING CAMERA EQUIPMENT UNIT AND FILM MAGAZINE USED
THEREWITH BUT ALSO CONSTITUTING A DISTINCT UNIT
Filed Aug. 10, 1935    9 Sheets-Sheet 4

INVENTOR
Edson S. Hineline
BY
his ATTORNEYS.

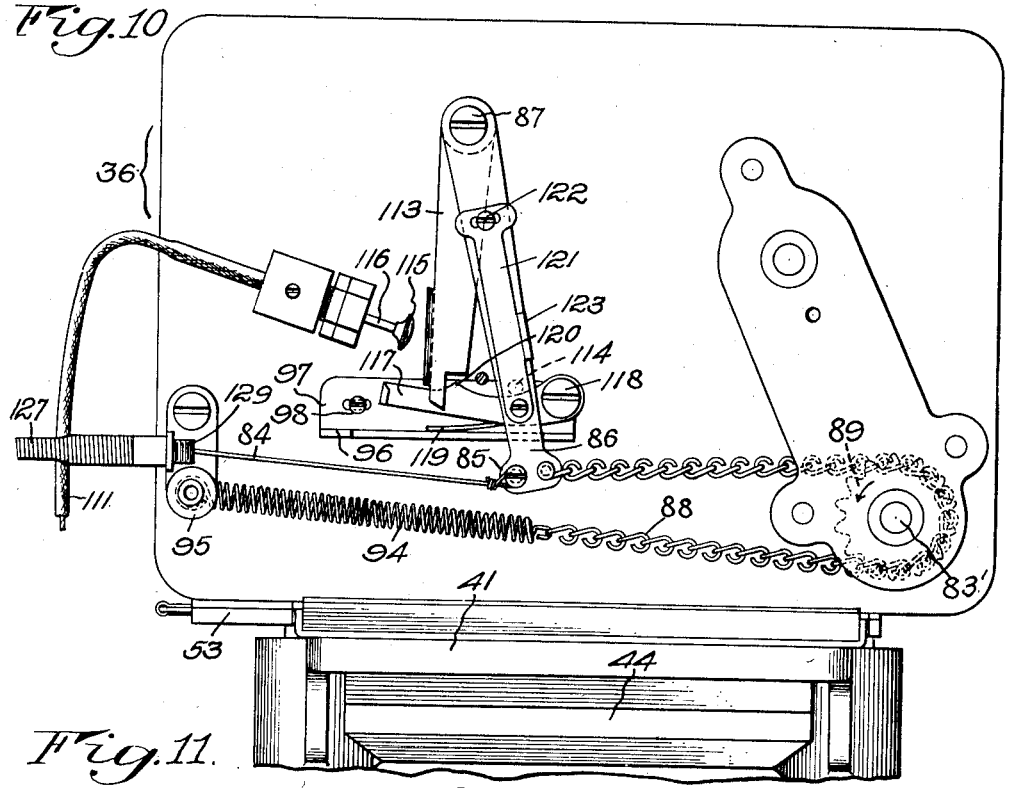
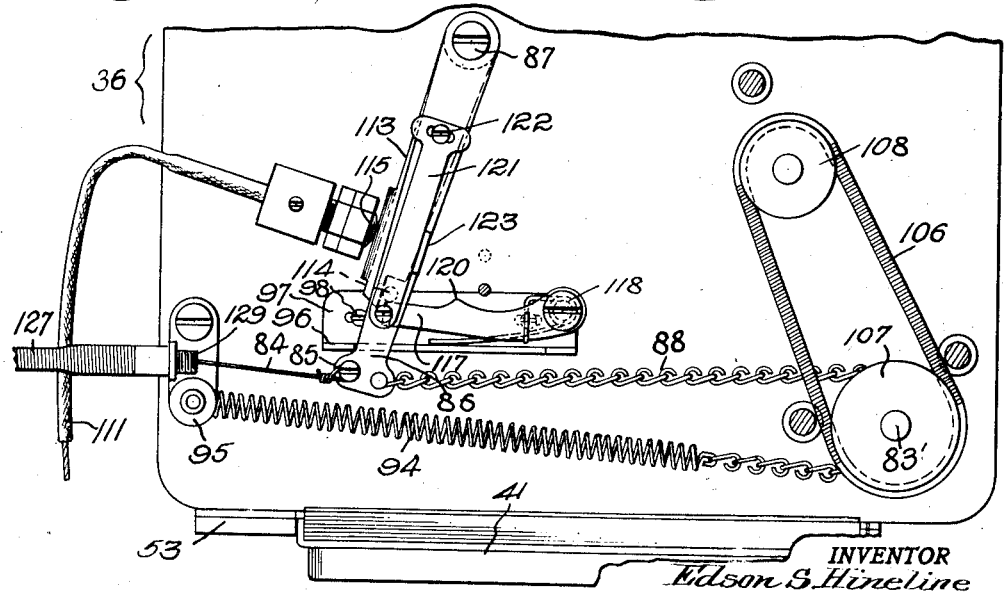

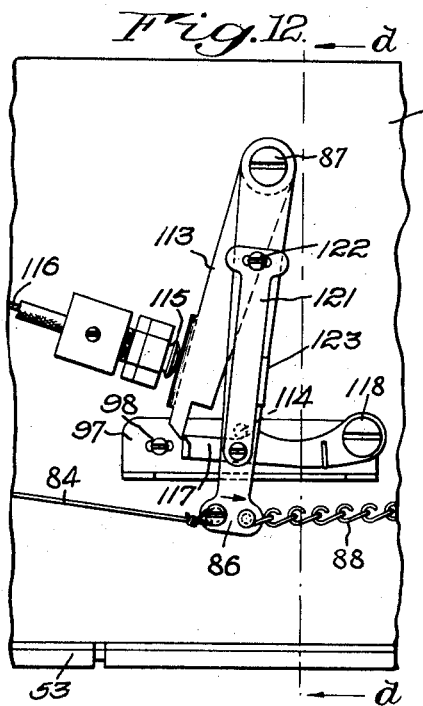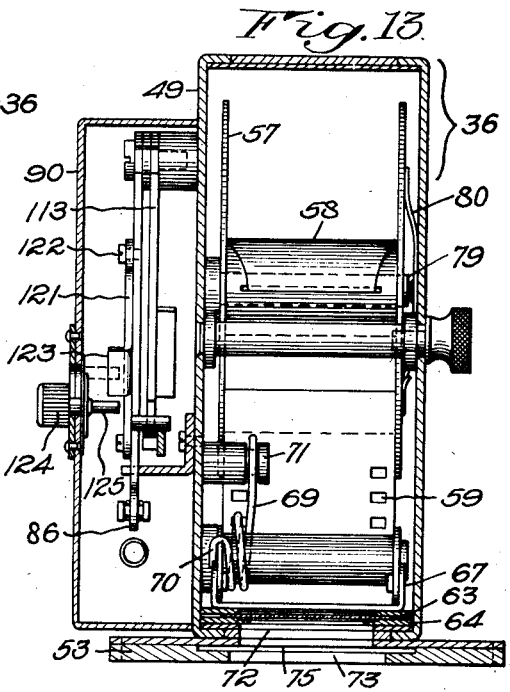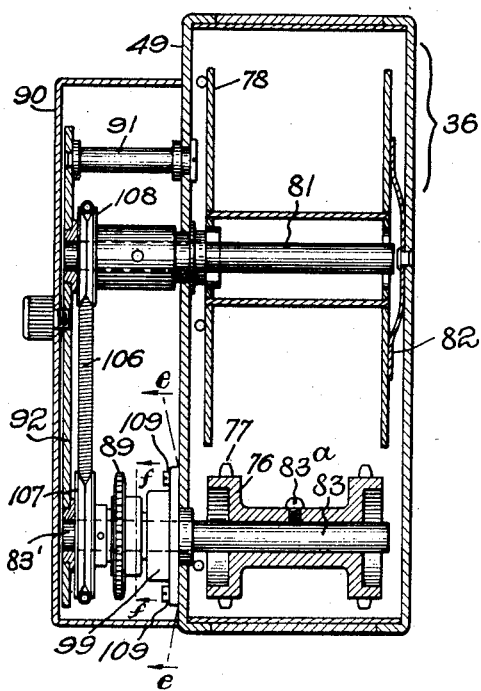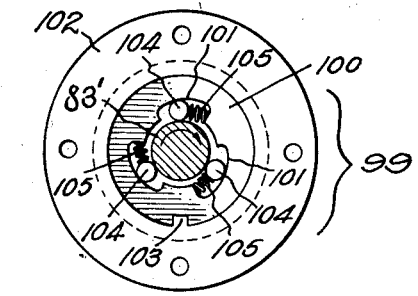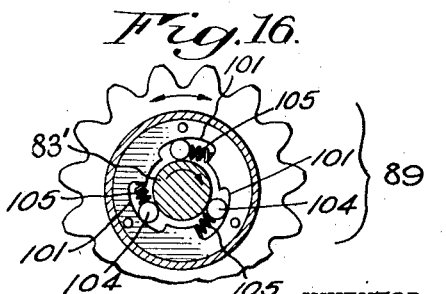

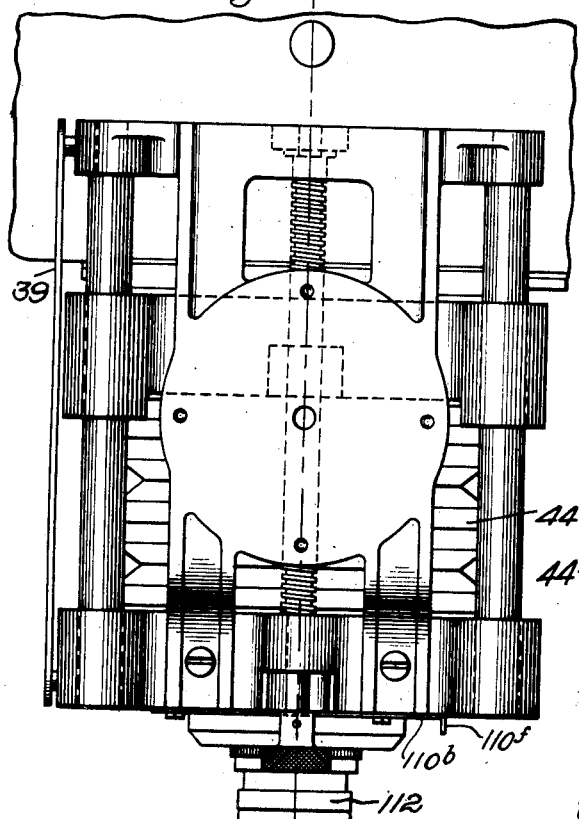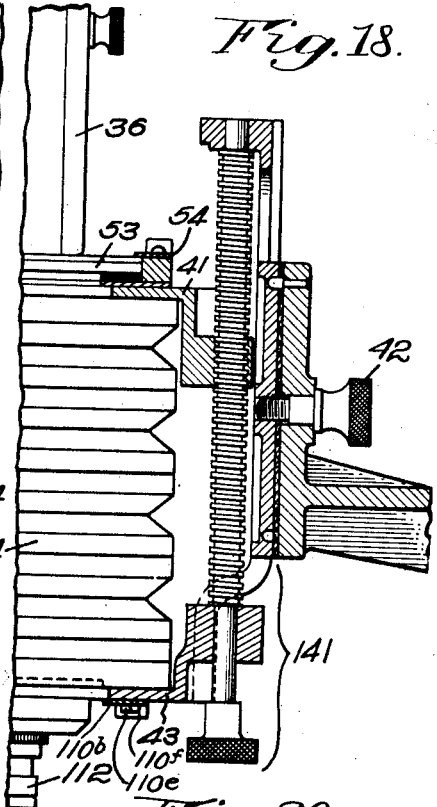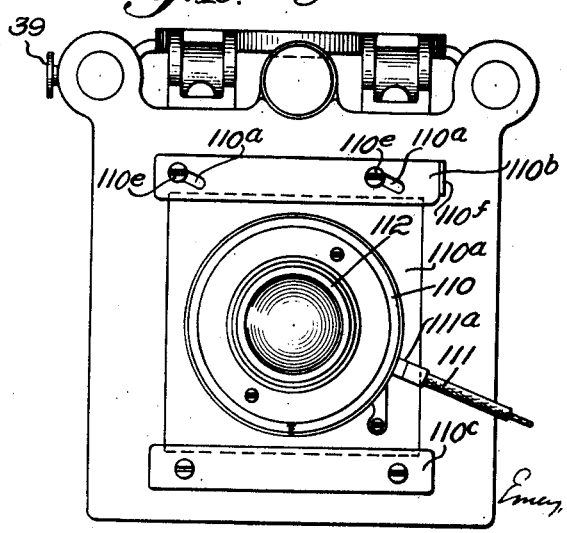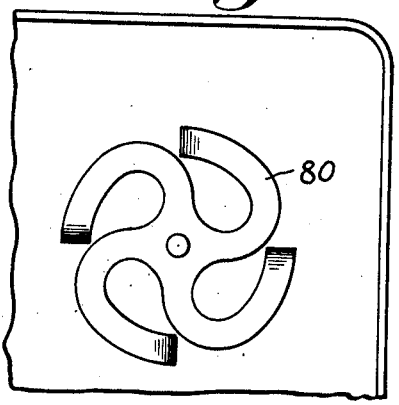

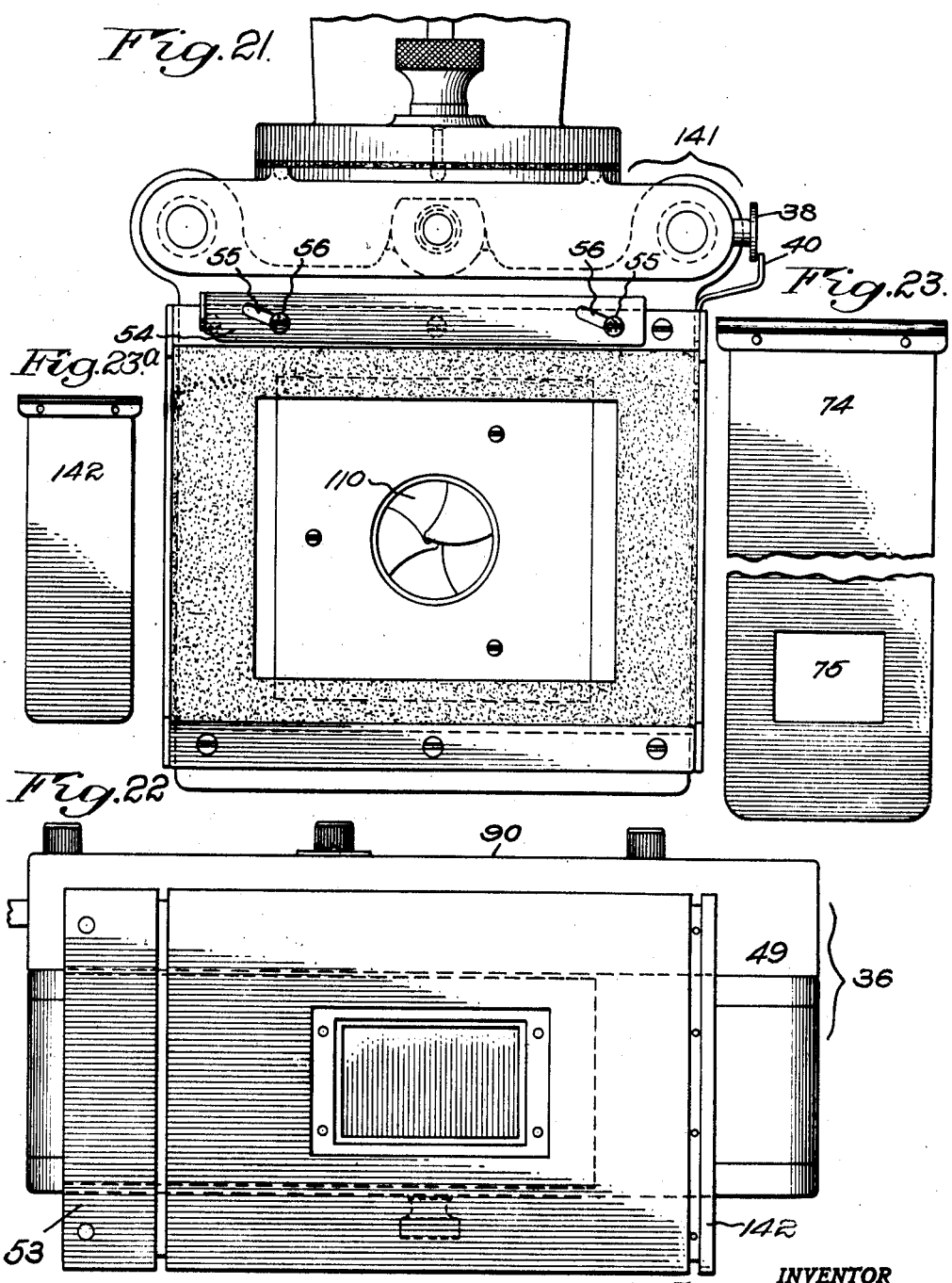

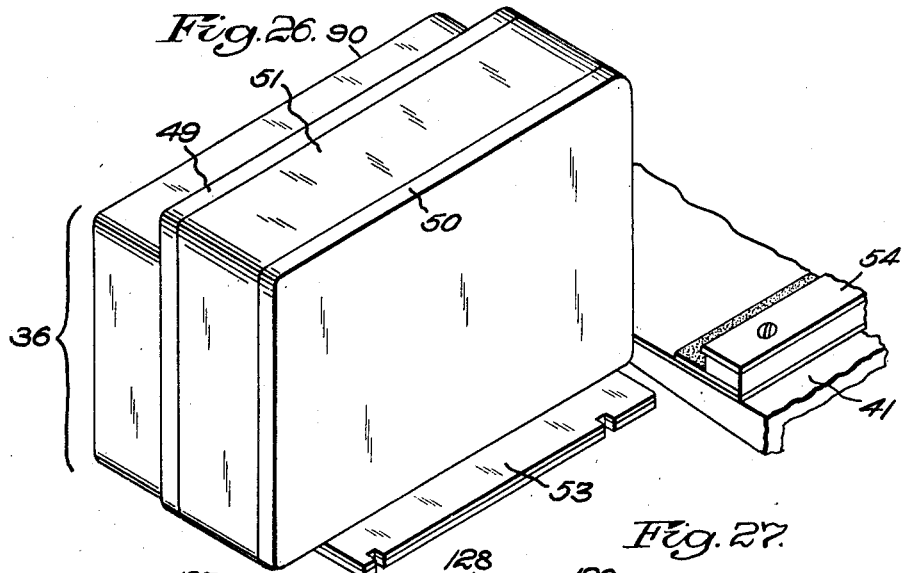
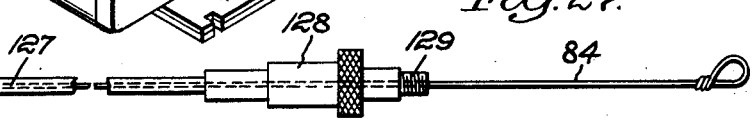
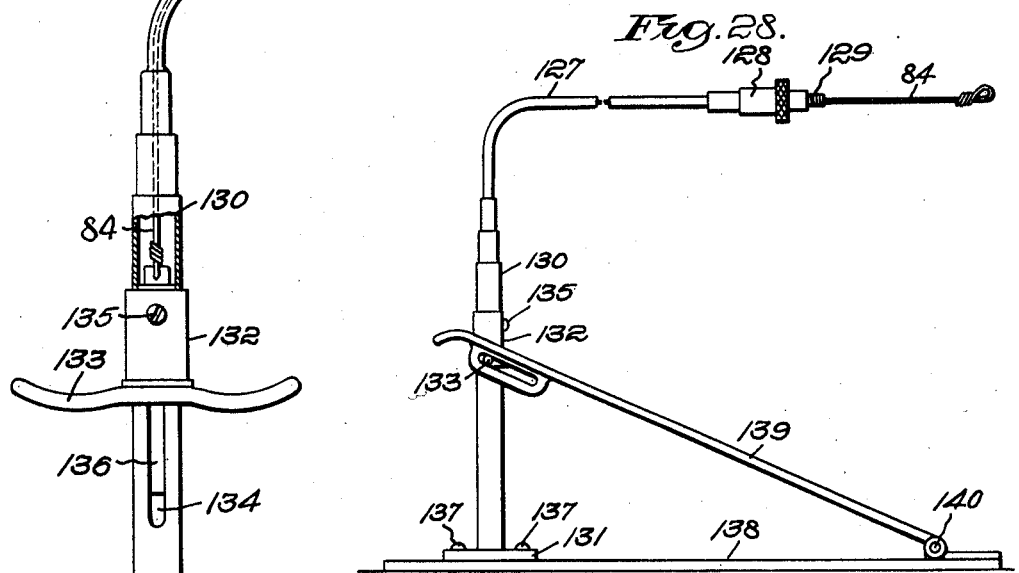
INVENTOR:
Edson S. Hineline
BY
his ATTORNEYS.

Patented Jan. 26, 1937

2,069,186

UNITED STATES PATENT OFFICE 2,069,186

COPYING CAMERA EQUIPMENT UNIT AND FILM MAGAZINE USED THEREWITH BUT ALSO CONSTITUTING A DISTINCT UNIT

Edson S. Hineline, Rochester, N. Y., assignor to The Folmer Graflex Corporation, Rochester, N. Y., a corporation of Delaware Application August 10, 1935, Serial No. 35,612

30 Claims. (Cl. 88—24)

This invention relates to means for making photographic copies or records of printed pages or matter of a like character, and in order that the principle of the invention may be readily understood, I have disclosed one embodiment thereof in the accompanying drawings.

The object of the invention is to provide means for doing this work in a very simple manner so that it does not require an experienced operator. A further object of the invention is to make such means readily portable so that it can be easily transported from place to place, very quickly put into operation and occupying a minimum of space both in use and when packed away in its dual-purpose case. It has long been desired to have suitable means for making copies of rare books, etc., but heretofore the apparatus has either been very bulky and intricate to operate or resort has been had to some substitute means, which, not being primarily designed for the work at hand, rendered operation rather difficult, and unless very carefully handled the results were not equal to results obtained by the more intricate apparatus heretofore used. The apparatus herein disclosed has all the capacity of the features of the more intricate apparatus heretofore used and is very simple to operate and can be packed into a very small container.

A further purpose of the apparatus is to provide means permitting changing from one type of sensitized material to another, such, for example, as standard moving picture film or a sensitized paper strip known as "positive paper". This I have rendered possible through the employment of interchangeable magazines. It is a further purpose of this invention to allow the camera to be used for ordinary photographic purposes.

I will now proceed to describe the apparatus and the operation thereof.

In the drawings:

Fig. 1 is a side elevation looking from the side showing the assembly of the case, now serving as the platen, the vertical post, the camera mounting arm, and the camera with one of the magazines attached;

Fig. 2 is a rear elevation showing the post and the mounting brackets that are a part thereof, and showing the assembly attached to the rear of the case;

Fig. 3 is a cross section of the joint of the upright post;

Fig. 4 is a cross section of the lamp supporting arm taken on the line a—a, Fig. 1;

Fig. 5 is a front elevation of the apparatus shown in Fig. 1 with the addition of the lamps and lamp brackets and the operating table;

Fig. 6 is a top plan view of the case in position to be used as a platen, and also showing the post mounting bracket;

Fig. 6a is a bottom plan view of the parts shown in Fig. 6 and showing partitions arranged for the packing of the various parts of the outfit into the case;

Fig. 7 is a side elevation of the magazine with the cover removed and showing the path of the sensitized material;

Fig. 8 is a detail in cross section of the magazine taken on the line c—c of Fig. 9;

Fig. 9 is a cross section of the magazine taken on the line b—b of Fig. 7;

Fig. 10 is a side elevation of the operating mechanism of the magazine with the cover removed and the film feed lever in position to be moved to feed the film;

Fig. 11 is a similar view with the film-feed lever in the position occupied at the end of a feeding movement;

Fig. 12 is a similar view of the operating lever showing the shutter operating latch in depressed condition;

Fig. 13 is a vertical cross section of the magazine taken on the line d—d in Fig. 12;

Fig. 14 is a vertical cross section of the magazine taken through the take-up spool and feed sprocket;

Fig. 15 is a vertical section on the line e—e of Fig. 14, showing one of the over-running clutches;

Fig. 16 is a vertical sectional view on the line f—f of Fig. 14 taken through the sprocket drive, over-running clutch;

Fig. 17 is a rear elevation of the camera;

Fig. 18 is a vertical cross sectional view of the camera taken on the line g—g of Fig. 17;

Fig. 19 is a bottom plan view of the camera, showing the lens and shutter mounting;

Fig. 20 is a detail of the magazine cover showing the film tension device;

Fig. 21 is a top plan view of the camera, the magazine having been removed;

Fig. 22 is a bottom plan view of the magazine removed from the camera;

Fig. 23 shows a special dark slide that is used when making exposures, requiring but one half of the exposure area;

Fig. 23a is a similar view showing a dark slide to be applied to the magazine before detaching the latter from the camera;

Fig. 24 is a plan view of a portion of film strip showing in shaded lines the exposure area when the normal feeding movement is employed;

Fig. 25 is a similar view of the film strip, the shaded portions representing the area exposed when a feeding movement is reduced to one-half the extent and when the slide of Fig. 23 is in use;

Fig. 26 is a perspective view of the magazine and its base plate;

Fig. 27 is a plan view of the manually operable means by which the film is advanced and the shutter opened and closed, an intermediate portion of the said means being broken away; and Fig. 28 is a view in side elevation generally similar to Fig. 27, but indicating a foot treadle operating means for the said parts.

Referring more particularly to the drawings, showing one embodiment only of the invention and to which embodiment my invention is not limited, I have represented at 1 in Figs. 1, 5, 6, 6a, the case or container for the entire copying camera equipment unit. As there shown the said case is composed of the two members 2, 3 hinged together, as indicated most clearly at 3a in Figs. 2 and 6a, in the general manner of a suit case. It is provided with a suitable handle 4 and is adapted, when opened out, to serve as a platen or work table for the entire equipment unit. The outer faces of the said two members 2, 3 of the case serve as the platen, as indicated in Fig. 6, and they are marked as indicated at 5 in said figure with right angles positioned to indicate where the object or objects to be photographed should be positioned so as to be accurately centered with respect to the camera supported thereabove. The said markings 5 are shown as sufficient in number to indicate the exact positioning of books or articles of five sizes, but obviously they may be varied within the scope of my invention.

In order to insure the stability of the case 1 in open position and also to provide a support for the standard or upright, I have provided two brackets 6, 7, shown most clearly in Figs. 1, 2, 6 and 6a, which are secured in position by four screws 8 that are received in suitable screw holes provided in the two members 2, 3 of the case 1. The construction is such that when the brackets 6, 7 are in functioning position they hold the two parts 2, 3 of the case 1 firmly in open position. When the outfit is disassembled the said brackets 6, 7 with the screws 8 are placed in the case 1.

The parts of the copying outfit including the camera, the magazine and the lamps, are adapted to be supported in suitable position with respect to the case 1 and desirably vertically above the same as best indicated in Figs. 1 and 5.

While any suitable means may be provided for this purpose, I have provided means adapted to be readily disassembled and to be packed for carrying in the case 1 as indicated in dotted lines in Fig. 6a. Herein for the purpose I have provided a standard composed of the posts 9, 10. The said posts are tubular and are adapted to be detachably connected together in any suitable manner and preferably by means of the co-actingly threaded parts 11, 12, which are respectively permanently attached to the two tubular members 9, 10 of the standard. By the construction shown, it will be seen that I have provided a standard which is of sufficient length for supporting the camera at any necessary height above the case, platen or base 1, and which may be very readily disassembled by unscrewing the members 9 from the member 10 and removing the latter member from the brackets 6, 7. All said parts, including also the camera and the magazine, are then packed in the case 1, as shown in Fig. 6a.

In order to provide suitable illumination, any suitable means may be used. In order, however, to provide means which, when disassembled, may be readily packed or placed in the casing 1, I have provided two lamps 13, 14, shown most clearly in Fig. 5, which are adjustably and removably supported upon the standard 9, 10. Herein for the purpose I have represented a lamp bracket 15, shown most clearly in Figs. 1 and 4, as adapted to be tightened together about the member 9 or 10 of the standard by the screw 16 of the clamp 17. The said bracket 15 receives in the opening 18 therethrough, the tubing 20, as shown most clearly in Figs. 4 and 5. The said tubing 20 is desirably permanently positioned in the said bracket 15 and extends equally to each side of the standard or upright, as shown most clearly in Fig. 5. To the ends of the said tubing 20 are removably connected the tubing members 21, 22 by means of bracket members 23, 24, preferably provided with set screws, as shown, by which they may be tightly positioned. I also, in this embodiment of the invention, provide the additional tubular members 25, 26 adjustably and removably connected by similar brackets 27, 28 to the tubing members 21, 22 and upon said horizontally positioned tubing members 25, 26, I support by suitable short tubes 29, 30 the two electric lamps 13, 14, which, as indicated at 31, 32, are adapted to be connected with any suitable lighting current. The described construction is such that either or both of the lamps 13, 14 may be moved to whatever position will give the best illuminating effect.

The camera and the magazine are supported in suitable manner above the case or platen 1 and preferably by a single bracket or member, inasmuch as in the disclosed embodiment of the invention the magazine is detachably supported upon the camera. For the purpose and as most clearly shown in Fig. 1, I have provided a bracket 33 which is adapted to be detachably clamped in position about the standard 9, 10, by means of a clamp screw 34 by which the split portions of the bracket 33 are tightened about the standard. The camera indicated generally at 35 is suitably supported upon said bracket 33, as will be more fully described, and after the magazine, generally indicated at 36 in Fig. 1, is removably positioned upon the camera 35 and secured in position, the copying camera assembly or equipment unit is in position for taking pictures, prior to which act, however, the camera 35 with its magazine 36 should be positioned at just the right distance above the platen 1 that is suitable for the desired reduction in size of the picture in comparison with the object that is being photographed. In order very readily and accurately to make the desired adjustment of the position of the camera the columns or tubes 9, 10 of the standard are marked with a scale desirably in inches and indicated at 37 in Fig. 1. As indicated, these marks range from 10 to 20 and are intended to cover the entire adjustments in height of the camera 35 above the case or platen 1. A similar or corresponding adjustment of the camera must be obtained in order to secure the proper focusing and for this purpose there is provided an upright bracket or member 38 having thereon a scale 39 along which moves a pointer 40 on the member or part 41 of the camera. The said focusing is secured by proper adjustment of the focusing knob 42 which is then tightened in position. It is to be understood that the scale 39 corresponds with and is correlated with respect to the scale 37 on the standards 9, 10, so that when in properly focused position the pointer 40 should be opposite the numeral which is the same in value as seen at the lower edge of the flat portion of the bracket 33. This is clearly indicated in Fig. 1, wherein the camera is indicated as supported fifteen inches above the platen 1.

My invention is not limited to the use of any particular camera, though I prefer to employ a camera of the so-called Graflex type. I have not illustrated such a camera in detail, but I have in Fig. 1 represented a rear part 41 and a front part 43 and a bellows 44. No inclined mirror and no curtain shutter is used with the Graflex type of camera shown in Fig. 1 when the same is used as a part of the copying camera outfit, but it is clearly to be understood that I am in no wise limited to the use of any particular camera.

Desirably in using the camera, especially if it be a Graflex camera, some part or accessory thereof is removed or displaced from the back portion of the camera and the magazine 36 is substituted therefor, as will be described in detail. The part that is removed from the Graflex camera may be any Graflex accessory such as a plate holder or film holder, a cut film magazine or a roll holder. It is not necessary to make any change whatsoever in the back of the camera from the regular Graflex construction.

As stated, however, the invention is not limited to the use of any particular type of camera and indeed one object of the invention is to provide a construction permitting the use of an ordinary camera together with a magazine, which itself is a separate unit usable with various cameras.

The camera with the attached magazine having been adjusted to the proper height above the platen 1 and the camera having been properly focused and the electric lamps 13, 14 (which are provided with suitable sockets 45, 46 and reflectors 47, 48) having been illuminated, it is necessary merely to place the objects to be successively photographed one after another in proper position upon the case or platen 1, and to operate at desired intervals the manually operable means which will hereinafter be described, and by means of which the sensitized film, strip or other sensitized sheet or element will be intermittently fed and the shutter will be caused to function.

Before describing the operating means, I will refer in detail to the structure of the magazine and the parts contained therein. The magazine generally indicated at 36 in Fig. 1 as detachably mounted at the back of the camera 35 (that is, above the camera when in the position shown in Figs. 1 and 5) is shown in perspective as a unit in Fig. 26. The said magazine as herein shown includes a box or casing or any suitable construction. As most clearly shown in Figs. 7, 8, 9, 13, 14 and 26, there are provided two cover or end wall portions 49, 50, and an intermediate encircling portion 51 as shown in Fig. 9. An inner member or piece 52, shown in section in Fig. 9, is desirably attached to the end member 49, so as to constitute in effect a part of a cover portion provided by said member 49, thereby permitting the ready opening up of the magazine in order to place the film or sensitized sheet or sheets in position. The said magazine 36 is provided with a base plate or portion 53, shown most clearly in Figs. 1, 5, 7, 8 and 13. When the back or accessory of the camera 35 has been removed or displaced, the magazine 36 is substituted in its place, as indicated in the said figures, and a retaining slide 54 (shown in Fig. 1 and on an enlarged scale in Fig. 21) is slid into position over an edge of the said base plate or portion 53, thus securing the magazine 36 removably in functioning position. For this purpose, the said slide 54, as shown in Fig. 21, is provided with two inclined slots 55 which are received under screw heads 56, so that upon sliding movement of the slide 54, it is moved inward over an edge of the base 53 of the magazine.

Referring more particularly to Figs. 7, 8 and 9, there is suitably mounted in a wall or walls of the magazine 36 a film supply spool 57 which receives the sensitized material 58 which may be of any suitable character or type, but which is preferably a continuous film, such, for example, as that shown in Fig. 24, where the same is represented as having feeding openings 59 equally spaced along opposite edges thereof. The sensitized face of the said film may be a continuous sensitized surface or it may consist of sensitized areas slightly spaced from each other. Merely for convenience of description, I have in Fig. 24 represented areas 60 to indicate the longitudinal extent or the distance to which the film is fed at a single impulse if the film is fed to what I term the normal or full length for each feeding movement of the parts. As hereinafter more fully explained, I may, if desired, feed the film a lesser distance for each of a series of impulses or movements, as, for example, one-half the distance indicated in Fig. 24, and therefore I have at 61 in Fig. 25 represented the feeding of the film one-half the distance that it is fed for each impulse as indicated in Fig. 24.

The path of movement of the film or sensitized strip is best indicated in Figs. 7, 8 and 9, and the direction of arrows in Fig. 7 indicates the direction of the feed of the film. As shown in said figures, the said film as it leaves the supply spool 57 passes about a roll 62 and thence between two pressure pads 63, 64, the latter of which is fixedly secured as by screws 65 to a wall of the magazine casing, and the former of which is yieldingly and with sufficient pressure held in contact with the film by a pressure pad arm 66 pivoted at 67 to the said pressure pad 63 and pivotally mounted at 68 in the magazine. A pressure pad spring 69 is coiled about the pivot pin 68, and at one end 70 bears upon the arm 66 the other end of the said spring being received under a stud 71 in the wall of the magazine. Thus, the film is held firmly or yieldingly and in a smooth condition as it passes the exposure opening 72 provided in the wall of the magazine that has secured thereagainst the said base plate 53. The said base plate 53 is also provided with an exposure opening 73 and, as will be more fully hereinafter described, a slide 74 is receivable in a suitable slot 74a in the said base plate 53. The said slide 74 has an opening 75 of an area that will be referred to in connection with the feeding of the film one-half the normal feed (that is to say, when the film is fed to the extent indicated in Fig. 25). When the film is fed the normal or full extent of a single manual movement or impulse, the slide 74 is not used and therefore is withdrawn from the position shown in Fig. 8.

The film 58 passes from over the exposure opening 72, 73 about a measuring sprocket 76 (shown in side elevation in Figs. 7 and 8 and in longitudinal section in Fig. 9). The said sprocket is provided with teeth 77 which engage the feed openings 59 of the film. From the said measuring sprocket 76 the film passes to the take-up spool 78 shown in Fig. 7.

The supply spool 57 and the take-up spool 78 are suitably mounted in a wall or walls of the magazine. As best shown in Fig. 13, the supply spool 57 is mounted in both walls of the magazine upon a suitable spindle 79, and a tension spring 80 is provided to prevent over-running of the said supply spool. As shown most clearly in Fig. 14, the take-up spool 78 is mounted in one of the walls of the magazine 36 upon a spindle 81 and is provided with a suitable tension spring 82 to prevent over-running movement of the said take-up spool.

The movement of the film or sensitized strip or element is preferably an automatic one in the sense that mechanism is provided in the magazine to feed the film or equivalent element, which mechanism receives its movement or its impulses of movement from some suitable outside source of power, which in the present instance, for simplicity of structure and for other reasons, is a manually operated construction by which is meant a construction entirely under the will of the operator to control and cause to function from time to time in a series of impulses which may be imparted by hand of the operator or by his foot. This construction will be hereinafter more fully described.

Referring to the mechanism within the magazine for feeding the film or equivalent element along the described path and particularly referring to Figs. 8, 9, 14 and 15, the measuring sprocket 76 is attached to the measuring sprocket shaft 83 by a lock screw 83a. The movements imparted to the said shaft 83 are imparted in such a way as to prevent movement of the said shaft 83 in the opposite direction and also to prevent excess movement in the forward direction. For this purpose, I preferably provide what I term over-running clutches, the mechanism of which I will next describe as one embodiment of means for accomplishing this purpose. I desire it to be understood, however, that my invention is not limited to the use of an over-running clutch or clutches for this purpose, as a ratchet wheel or a spring structure may be employed for the same purpose.

Referring to the construction used in this embodiment of the invention, it is pointed out that there is provided a member to hold the film feed sprocket 76 from turning in a reverse direction. It is to be understood that the motions for forward movement are imparted to the measuring sprocket wheel shaft 83 through an over-running clutch mechanism, shown in section in Fig. 16, and that the said shaft 83 is also prevented from turning in the wrong direction by another over-running clutch shown in section in Fig. 15.

Without as yet describing the manually operable means for imparting the impulses of movement to the film feeding means, it is pointed out that, as shown most clearly in Fig. 10, there is shown one end of a cable or wire 84 that extends to the point where it receives the manual impulses of the operator at will. The said cable or wire 84 is connected at 85 to the lower end of a lever 86 pivoted at 87 in a wall of the magazine co-axially with certain other parts or members to be described. Also connected to the said lower end of the lever 86 is a chain 88 which passes about a suitable sprocket wheel 89 shown in dotted lines in Fig. 10 and in full lines in the sectional view Fig. 16. It is shown also in edge elevation in the sectional view Fig. 14.

The said sprocket wheel or sprocket gear 89 forms a member of an over-running clutch unit or mechanism which I have herein represented as mounted in the portion of the magazine 36 that is applied to the left hand side viewing Figs. 1, 13, 14 and 26 of the magazine structure. As there shown, there is a supplemental wall or member 90 that is suitably connected to or forms a part of the main casing of the magazine and wherein are positioned a plurality of spacers 91, one of which is best shown in Fig. 14 as supported at its inner end in a main wall 49 of the magazine. There is also provided a bearing plate 92, best shown in Fig. 14, and wherein the said spacers 91 are mounted as well as the shaft 93 of the over-running clutch mechanism and which is in alignment with or may be a unitary structure with the shaft 83 of the measuring sprocket wheel 76.

When, now, an impulse or pull is imparted to the cable or wire 84, the chain 88 is drawn upon and causes the sprocket and over-running clutch assembly 89 to have a rotative movement in a contraclockwise direction as shown by the arrow in Fig. 10. This consequently causes a like movement of the sprocket wheel measuring shaft 83 and the sprocket wheel 76 fast thereon so that the film 58 is fed forward by reason of the engagement of the teeth of the sprocket measuring wheel with the holes 59 in the film.

Upon release of pressure or pull upon the cable or wire 84, the spring 94 (shown in Fig. 10 as connected to an end of the chain 88 and also at 95 to a pin in the wall of the magazine casing) causes the chain 88 and cable or wire 84, the lever arm 86 and the sprocket wheel 89 to return to their former position. It will be noted that the extent of forward movement of the lever 86 is determined by a stop plate 96, shown in Fig. 10 as provided upon a plate 97 adjustably mounted by slot and screw construction 98 in a wall of the magazine so that the extent of the forward movement of the lever 86 may be very accurately fixed or determined or limited.

The measuring sprocket shaft 83 is held from participating in the return movement of the sprocket gear 89 by reason of the over-running clutch mechanism indicated generally at 99 in Fig. 9 and shown in detail in Fig. 15.

While the over-running clutch mechanism may be of any suitable character and while other means accomplishing the same purpose may be employed instead, I will now describe the said over-running clutch mechanism sufficiently to cause an understanding of the precise function served thereby in the present organization.

Referring particularly to Fig. 15 (and also to Fig. 16, wherein like parts shown are given the same numerals), the shaft 93 is understood to be free to turn in one direction (that is, in the direction of the arrow thereon in Figs. 15 and 16). About the said shaft is a disk 100 having a series of cut-out, somewhat eccentric portions 101 equally spaced about the shaft. While any suitable number of such spaces may be provided, I have found that the provision of three with the accompanying rollers effects a well balanced load. As shown in Fig. 15, there is provided an outer shell 102 which is keyed to the disk 100 and is held in a stationary position by a key 103. At 104, I have shown a series of small rollers each pushed forward by a small coil spring 105. There are provided as many rollers and springs as there are recesses 101.

When the shaft 83' is turned in the direction of the arrow thereon in Figs. 15 and 16 (that is, in a clockwise direction), it tends to move each roller 104 in a like direction therewith and as each recess 101 is eccentrically cut or formed as clearly shown in Figs. 15 and 16, the said rollers 104 have more room for movement in a direction to compress the springs 105. Therefore, the said rollers 104 free themselves from the shaft 83' and allow the said shaft to have a rotative movement in the direction of the arrow but with a slight tension applied thereto through the said springs 105. If, however, it be attempted to rotate the shaft 83' in a contrary (that is, in a contraclockwise direction), the rollers 104 are crowded to the narrow portion of the respective recesses 101, thereby locking the shaft 83' and rollers 104 and preventing any rotation of said shaft in a contraclockwise direction.

Referring again to the course of the film 58, it will be observed (viewing Figs. 8, 9 and 13) that the film is fed forward past the exposure opening 72, 73. The said film is caused to be wound on the take-up spool 78 of Fig. 7 by means of a flexible or coiled spring belt 106 (best shown in Figs. 11 and 14). The said belt passes about a small pulley 107 fast on shaft 83' and also about a small pulley 108 on the shaft 81 of the said take-up spool 78, and receives its motion from the shaft 83'. Accordingly whenever said shaft 83' is given an impulse of rotation, the pulley 107 has a like movement which it imparts to the belt 106 and the pulley 108, causing the shaft 81 to turn in the direction of the adjacent arrow in Fig. 7 (that is, in a clockwise direction), thus taking up the film precisely as fed by the measuring roller 76 in Figs. 7, 8 and 9.

It will be noted that because of the provision of over-running clutches, the take-up spool 78 and the shaft 83 will be turned in one direction only, and that through the slipping action of the coiled spring belt 106, suitable tension is caused to be placed upon the film 58 between the said measuring sprocket 76 and the said take-up spool 78. It will be noted, referring to Fig. 9, that the clutch assembly 99 is secured to the wall 49 of the magazine 36 by screws or rivets 109. While I prefer to mount certain of the operating parts for effecting the feed of the film, between the walls 49 and 90 of the magazine 36, I may mount them all between the walls 49, 50 and modify the shape and structure of the wall structure of the magazine accordingly.

I have explained how the film is caused to be advanced automatically past the exposure opening 72, 73, but at the will of the operator. I will next explain how the shutter is caused to function at the proper time for making exposures after the film has been fed so as to present a fresh area or portion thereof and while the said film is stationary. In other words, the exposure is made while the film is stationary, and while my invention is not limited to doing this, it is the preferable construction and operation, and constitutes an important feature of my invention.

I have not illustrated in detail the structure of the shutter which is merely diagrammatically indicated at 110 in Fig. 19 and also indicated in Fig. 21 with respect to certain of the movable parts thereof.

The shutter which I prefer to employ is of the so-called automatic type in that it is self-setting. It is provided with the usual pawl or equivalent element with which the operating means to be described is connected, in accordance with my invention, and in such way as to cause the shutter to function upon the release of pressure, as will be described.

The said shutter 110, which itself may be of any suitable type, is represented in Fig. 19 as mounted together with the lens upon a square plate 110a, clearly shown in Fig. 19 (having as usual a central opening for the passage of light). The said plate 110a is, as shown in Fig. 19, readily removable, being received in the front part or wall 43 of the camera, as indicated also in Fig. 18, being supported removably in position by an upper and a lower guide 110b and 110c, the former having inclined slots 110d for the reception of screws 110e. Said guide 110b is provided with a bent end 110f shown in Figs. 17 and 19, by means of which said guide 110b may be slid to the left viewing Fig. 19 to release the plate 110a, the shutter 110 and the lens from both said guides, so that if desired the shutter and the lens as a unit may be removed from the camera when disassembling the parts for packing in the case.

As shown at 111 in Fig. 19 and also in Figs. 5, 10 and 11, there is provided what I term a "cable release" that transmits motion to the shutter from the operating mechanism within the magazine 36. The lens is merely diagrammatically indicated at 112 in Figs. 1, 5, 17 and 19.

It will be observed, viewing Fig. 19, that the "cable release" 111 is connected to the shutter mechanism and that it is readily separable therefrom at the line 111a, shown in Fig. 19 to indicate a conventional screw thread or other detachable connection. Thus, for disassembling the parts for packing in the case 1, the shutter and lens unit 110, 112 may itself be removed from the camera 35, or may be left in place in the wall 43 of the camera, and the "cable release" 111 may be detached at the line at separation 111a.

While I prefer entirely to separate the camera 35 and the magazine 36 from each other at the base plate 53 for packing in the case 1, as already described and as shown in Fig. 21, it is to be understood that the flexible cable release 111 may be, and the same is indicated as, of such length as to permit the camera and magazine to be packed or placed in the case 1 without removing the shutter and lens unit from the camera or separating said cable release at the line of separation 111a. Preferably in any case I do separate the camera and the magazine from each other at the base plate 53.

Referring to Figs. 10, 11 and 12, it will be noted that when the cable or wire 84 is pulled upon, the lever 86 is moved into the position shown in Fig. 11, carrying with it a lever 113 (pivoted at 87) by reason of the contact of a pin 114, shown in dotted lines in Figs. 10 and 11 as upon said lever 86, so that the button 115 and plunger or piston 116 upon the end of the cable release device 111, are caused to move to the left from the position shown in Fig. 10 (that is, into the position indicated in Fig. 11). When in this position a pawl 117 that is pivoted at 118 upon the plate 97 is pushed upward by means of a plate spring 119 and engages the lower end of the said lever 113, thereby holding it in the position shown in Figs. 11 and 12. When the cable release mechanism is in the position shown in Figs. 11 and 12, it causes the pawl mechanism or other suitable mechanism in the automatic shutter to become engaged with coacting parts in the shutter, so that the shutter will function upon the release of pressure or pull on the said button 115. I have, however, so constructed and arranged the parts that the shutter is caused to function upon the release of the button 115 (that is, with the movement of the said button back into the position shown in Fig. 10).

When the cable or wire 84 is released from its position given it by the pull or impulse thereon, the lever 113 remains in the position shown in Figs. 11 and 12 until the said pin 114 engages a raised portion 120 upon the said pawl 117. This engagement causes the pawl 117 to be pushed downward, thereby releasing lever 113, and the spring tension in the shutter causes the piston rod or plunger 116 and button 115 (that is, the said "cable release") to return to normal position. The said action also causes the shutter to operate. This cooperation and timing are important because they provide that the film is at rest when the exposure is made; the shutter, it will be understood, remains closed while the cable or wire 84 is pulled upon and until the said cable or wire has been released and started well on its way back and then the shutter is tripped and functions to permit the exposure.

I have referred to the fact that the film may, when desired, be fed a distance less than the regular or normal distance provided by the mechanism thus far described. This I accomplish through the control of the return movement of the lever 86 (that is, upon its movement to the right viewing Fig. 10 in preparation for its next movement to the left viewing said figure). It will be understood that if the said lever 86 were stopped half-way on its movement to the right viewing Fig. 10, and then advanced again to the left, it would cause only one half the length of film to be advanced at a single movement (that is, it would cause the film to be fed as indicated in Fig. 25). At times such a movement is very desirable, since, for the sake of economy, it is sometimes desirable to take twice as many pictures through a given length of film if the objects to be photographed are of small area. It, of course, will be understood that my invention is not limited to the making of the smaller feeding movement one-half the normal feeding movement, as it may be any desired proportional part thereof.

In order, however, to provide a very simple mechanism that will permit the operator quickly to set the magazine feeding mechanism so that only a proportional part of the film is advanced as indicated in Fig. 25 instead of the normal portion as indicated in Fig. 24, I have provided the following mechanism.

A so-called buffer lever 121 is provided as best shown in Figs. 10, 11 and 12. The said lever is adjustably mounted upon the lever 86 by means of a slot and screw connection as shown at 122 in said figures. The said buffer lever 121 has a projection or upturned portion 123, shown in Figs. 10, 11, 12, 13. In Fig. 13, there is shown a vertically sliding knob 124 provided with an inwardly projecting pin 125. When the said knob 124 is moved upward by the operator, the said pin 125 will engage with the projection 123 and thus prevents the lever 86 from returning to the right beyond the half-way position, and therefore the next movement of said lever 86 to the left will result in feeding the film strip only one-half the normal distance. Consequently only one-half the normal length of film is fed for each impulse or pull upon the cable 84, until the said knob 124 is again moved downward by the operator.

It will be noted that the construction of the various parts associated with the film feeding movement is such that the said half length movement of film nevertheless permits all the other operations to take place.

When only one-half or some other portion of a normal area of the film is used, it is necessary or highly desirable to mask the film area. It is for that purpose that I employ the slide shown at 74 in position in the base 53 of the magazine. The slide itself is shown in Fig. 23. As there shown, it is provided with a small aperture 75 suitably positioned therein and of proper size to mask the adjacent sensitized portion of the film that would have been entirely exposed if the film had been fed the normal full distance; that is to say, when the film is fed only as indicated by the area 61 in Fig. 25, the next area 61 is shielded by the slide 74 and only a single area 61 is exposed through the opening 75 of the slide 74.

The means under manual control of the operator and whereby the film feeding mechanism automatically operates, but only at the will of the operator, is shown detached in Fig. 27, a portion intermediate the ends being broken away, and the said device or means is shown in position in Fig. 5. While any other suitable or equivalent means to accomplish the same result may be employed, I will specifically describe the construction shown. Referring to said figures, the cable or wire 84 is received in a flexible coiled wire tubing 127 which is itself provided with an enlarged head or end 128 threaded as indicated at 129, so as to be screwed into a threaded opening in a wall of the magazine 36 in the position indicated in Fig. 5. The said casing and the cable or wire contained therein are of suitable length, as, for example, a yard or more, and at the opposite end of the said casing there is provided an enlarged tubular member 130 having a knob 131 at its extreme end and also receiving thereabout a sleeve 132 relatively slidable with respect to the knob 131 and provided with a laterally projecting symmetrically arranged portion 133 permitting the ready application of two of the fingers of a hand of the operator to the upper side thereof, viewing Fig. 27, and the application of pressure by the thumb to the knob 131. The said sleeve 132 is longitudinally slotted as shown at 134, the pin 135 being provided to prevent twisting movement. The wire or cable 84 is attached to an inner part of the sleeve 132 which extends as indicated at 136 in the tubular member 130. It will be understood that the spring 94 which returns the parts of the film feeding mechanism to the position shown in Fig. 10, draws the cable or wire 84 toward the right viewing Figs. 5, 10 and 27, and that the operator, when he wishes to cause a feeding movement of the film to take place and the shutter then to function immediately after the film has become positioned and stationary, presses the knob 131, thus pulling the cable or chain toward the left viewing Fig. 10.

My invention is, of course, not limited to the use of such control or operating means, and if I employ a manually operated means, I may operate the same by pressure of a foot of the operator. Such a construction is indicated in Fig. 28, where substantially the same parts are shown as in Fig. 27, but the knob 131 is shown as secured by bolts 137 to a base 138. A foot treadle 139 is pivotally mounted on the base at 140, and the same extends over the lateral projection 133 or an equivalent thereof, so that upon a very slight pressure upon the said foot treadle the desired impulse or pull upon the cable or wire 84 to the left viewing Figs. 10, 27 28, is given at any time. An advantage of this construction is that it leaves both hands of the operator free to handle the objects that are to be photographed. This foot operated means may be of very compact structure and may be packed in the case 1, though I have not there shown it, as it is a modification of the preferred construction.

So far as I am aware, I am the first to provide a copying camera equipment unit that can be compactly packed or assembled in a very few minutes, whose weight is kept down to a minimum, and the speed of operation of which compares very favorably to an electrically or mechanically driven apparatus, which so far as known to me are bulky and expensive and are not readily transportable by hand from place to place and which could not be readily carried in a hand case into a public library, a bank, or other place where books, records, or other articles are to be photographically copied. The speed of operation of the equipment unit herein disclosed depends wholly upon the rapidity with which each article to be photographed is placed normally in position upon the platen or case 1, rather than depending upon the operation of the camera itself. That is to say, the actual operation resolves itself into a simple squeeze of the hand upon the cable or wire release or to the application of foot pressure, to operate said cable release. Such an operation requires no greater time than would be required with an electrically driven or mechanically driven type of camera, and the periods of operation are entirely within the will of the operator and need not be at precisely recurring intervals, which is an advantage in cases where some of the articles to be photographed require a greater length of time for positioning the same.

I am aware that a cable release has been and is used on hand cameras but so far as I am aware I am the first to employ a so-called cable release for controlling the feeding means of a film feeding mechanism. Furthermore, I believe that I am the first so to employ a so-called cable release or other device or mechanism operable at the will of the operator in such a manner as to control the shutter also.

I have not shown in detail the internal construction of the camera diagrammatically indicated in Figs. 1, 5, 17, 18 and 21, inasmuch as my invention is not restricted to any particular type of camera and the herein disclosed magazine and operating mechanism may be attached or used with any type of camera within the scope of my invention, though I prefer to use it with a Graflex type.

In the present drawings, I have represented a camera having a Graflex back. The camera, as shown generally at 35, is made up of conventional parts, namely, a back, a bellows, a front board, a bed and a means for adjusting the focus or the relation or relative position of the front board which carries the lens, with respect to the back of the camera which carries the sensitized material, in this instance, in the magazine. Said means for adjusting the focus is shown most clearly in Figs. 17 and 18 at 141.

It is to be understood that some of the parts or mechanisms herein disclosed as used in the general combination of a copying camera equipment unit may also be used in other relation. Therefore my invention is not limited to the use of all the parts herein shown, in the combination shown, as will be evident from the claims. For example merely, it is pointed out that the magazine unit including the film feeding means may be used in other relations, and with other cameras, for general purposes. The same is, however, of peculiar importance in the general combination herein disclosed.

In Fig. 23a, I have shown separated from the magazine a dark slide 142 and I have shown said slide in position in the magazine in Fig. 10. This slide has no cut-out portion, and is to be inserted in position in the slot 74a to close the magazine before removing the magazine from the camera. Obviously, without such slide the portion of film at the exposure opening would be exposed each time the magazine is removed from the outfit.

Having thus described one illustrative embodiment of the invention, it is to be understood that although specific terms are employed, they are used in a generic and descriptive sense and not for purposes of limitation, the scope of the invention being set forth in the following claims.

I claim:

1. A copying camera equipment unit, adapted for ready assembling and disassembling and adapted to be readily carried in packed, disassembled condition, comprising a camera for general use but having a removable wall opposite the lens; a film magazine adapted to be removably applied to the back portion of said camera and having within the same means for feeding the film and adapted to be manually operated intermittently; lighting means; a standard whereon said camera with said applied magazine and said lighting means are adapted to be removably mounted; and a readily portable case adapted to be used as a platen or work table for the positioning thereabove of the objects to be photographed and to have said standard removably mounted thereon; said case being adapted to receive therein for transportation said equipment unit parts.

2. A copying camera equipment unit adapted for ready assembling and disassembling and adapted to be readily carried in packed, disassembled condition, comprising a camera; a film magazine adapted to be removably applied to said camera to be operated therewith and having within the same means for feeding the film and adapted to be manually operated intermittently; lighting means; a standard whereon said camera with said applied magazine and said lighting means are adapted to be removably mounted; and a readily portable case adapted to be used as a platen or work table for the positioning thereabove of the objects to be photographed and to have said standard removably mounted thereon; said case being adapted to receive therein for transportation said equipment unit parts.

3. A copying camera equipment unit adapted for ready assembling and disassembling and adapted to be readily carried in packed, disassembled condition, comprising a camera; a film magazine adapted to be removably applied to said camera to be operated therewith and having within the same means for feeding the film and adapted to be operated by exterior application of force; a standard whereon said camera with said applied magazine is adapted to be removably mounted; and a readily portable case adapted to be used as a platen or work table for the positioning thereabove of the objects to be photographed and to have said standard removably mounted thereon; said case being adapted to receive therein for transportation said equipment unit parts.

4. A copying camera equipment unit, adapted for ready assembling and disassembling and adapted to be readily carried in packed, disassembled condition, comprising a camera for general use but having a removable wall opposite the lens; a film magazine adapted to be removably applied to the back portion of said camera and having within the same means for feeding the film and adapted to be manually operated intermittently; a standard whereon said camera with said applied magazine is adapted to be removably mounted; and a readily portable case adapted to be used as a platen or work table for the positioning thereabove of the objects to be photographed and to have said standard removably mounted thereon; said case being adapted to receive therein for transportation said equipment unit parts.

5. A copying camera equipment unit adapted for ready assembling and disassembling and adapted to be readily carried in packed, disassembled condition, comprising a camera; a film magazine adapted to be removably applied to said camera to be operated therewith and having within the same means for feeding the film and for operating the shutter of the camera and adapted to be operated by exterior application of force; a standard whereon said camera with said applied magazine is adapted to be removably mounted; and a readily portable case adapted to be used as a platen or work table for the positioning thereabove of the objects to be photographed and to have said standard removably mounted thereon; said case being adapted to receive therein for transportation said equipment unit parts.

6. A copying camera equipment unit adapted for ready assembling and disassembling and adapted to be readily carried in packed, disassembled condition, comprising a camera; a film magazine adapted to be removably applied to said camera to be operated therewith and having within the same means for feeding the film; adjusting means whereby the extent of each feed movement of the film is substantially diminished, thereby permitting the use at each exposure of a part only of a single sensitized area of the film and adapted to be operated by exterior application of force; a standard whereon said camera with said applied magazine is adapted to be removably mounted; and a readily portable case adapted to be used as a platen or work table for the positioning thereabove of the objects to be photographed and to have said standard removably mounted thereon; said case being adapted to receive therein for transportation said equipment unit parts.

7. In a photographic apparatus, a camera having a shutter; a film package magazine adapted to be used with the camera; feeding means to feed the film in functioning relation to the lens of the camera; and a cable-like manual-power member extending exteriorly of the camera and magazine and adapted to be completely operated in each one of an unlimited number of manual impulses constituting a series of impulses, so as to transmit manual power by each of said impulses, said member being operatively connected to the film feeding means and operatively associated with said shutter to operate both of them by each of said impulses of manual power, the relation and arrangement of the said parts being such that each one of said impulses of manual power causes the operation of said film feeding means to feed film and also causes the operation of said shutter.

8. In a photographic apparatus, a camera having a shutter; a film package magazine adapted to be used with the camera; feeding means to feed the film in functioning relation to the lens of the camera, said film feeding means including a sprocket wheel, a chain thereabout, a manually operable cable connected to said chain, means to prevent reverse rotation of said sprocket wheel, and means operatively connected to said chain and to said shutter to operate the shutter.

9. A copying camera equipment unit adapted for ready assembling and disassembling and adapted to be readily carried in packed, disassembled condition, comprising a camera; a film magazine adapted to be removably applied to said camera to be operated therewith and having within the same means for feeding the film and adapted to be operated by exterior application of force; a standard whereon said camera with said applied magazine is adapted to be removably mounted; and a readily portable case consisting of two hinged members to receive therein for transportation said equipment unit parts, said case members adapted to be opened out and when so opened out to be used as a platen or work table for the positioning thereabove of the objects to be photographed and to have said standard removably mounted thereon when in opened-out position, said standard being of a knock-down construction permitting it to be placed in small compass in said case.

10. A copying camera equipment unit adapted for ready assembling and disassembling and adapted to be readily carried in packed, disassembled condition, comprising a camera; a film magazine adapted to be removably applied to said camera to be operated therewith and having within the same means for feeding the film and for operating the shutter of the camera while the film is stationary and adapted to be operated by exterior application of force; a standard whereon said camera with said applied magazine is adapted to be removably mounted; and a readily portable case adapted to be used as a platen or work table for the positioning thereabove of the objects to be photographed and to have said standard removably mounted thereon; said case being adapted to receive therein for transportation said equipment unit parts.

11. In a photographic apparatus, a camera having a shutter, a film package magazine adapted to be used with the camera, feeding means to feed the film in functioning relation to the lens of the camera, a cable-like manual-power member extending exteriorly of the camera and magazine and adapted to be completely operated by each one of an unlimited number of separate pull or pressure manual impulses for the purpose of feeding the film and operating the shutter by each of said impulses, a shaft turned thereby and acting to feed the said film, a lever actuated by said flexible means, and a cable release means operated by said lever and operatively connected to the said shutter to operate the latter.

12. In combination, a relatively small sized, self-contained camera and a relatively small sized, self-contained film magazine, both constituting members of a copying camera equipment unit, said camera and magazine having interengaging parts adapting them to be readily attached to each other for use in said unit and readily detachable from each other for packing and transportation with the other members of the said unit, as in a readily hand-carried case; said magazine having therein film feeding means and said camera having a shutter and lens; a single flexible means for the manual application of pull or pressure operatively connected to the film feeding means in the magazine and also operatively related to the said shutter in the camera, so as thereby to feed said film and to operate the shutter by each one of a series of impulses of manual power; the construction of said single flexible means and its connection to the camera and magazine being such that said camera and said magazine may be readily attached for use and readily detached for packing notwithstanding said operating means for the film feed and the shutter.

13. In combination, a relatively small sized, self-contained camera and a relatively small sized, self-contained film magazine, both constituting members of a copying camera equipment unit, said camera and magazine having interengaging parts adapting them to be readily attached to each other for use in said unit and readily detached from each other for packing and transportation with the other members of the said unit, as in a readily hand-carried case; said magazine having therein film feeding means and said camera having a shutter and lens; a single flexible means for the manual application of pull or pressure operatively connected to the film feeding means in the magazine and also operatively related to the said shutter in the camera, so as thereby to feed said film and to operate the shutter by each one of a series of impulses of manual power; said single flexible means being readily disconnectible from at least one of said members (namely, the camera or magazine), so that the camera and the magazine may be readily detached from each other for packing.

14. In combination, a relatively small sized, self-contained camera and a relatively small sized, self-contained film magazine, both constituting members of a copying camera equipment unit, said camera and magazine having interengaging parts adapting them to be readily attached to each other for use in said unit and readily detached from each other for packing and transportation with the other members of the said unit, as in a readily hand-carried case; said magazine having therein film feeding means and said camera having a shutter and lens; a single flexible means for the manual application of pull or pressure operatively connected to the film feeding means in the magazine and also operatively related to the said shutter in the camera, so as thereby to feed said film and to operate the shutter by each one of a series of impulses of manual power; said single flexible means being readily disconnectible from at least one of said members (namely, the camera or magazine), so that the camera and the magazine may be readily detached from each other for packing, a standard to support the camera and magazine to and from which they are readily detachable, said standard being of such construction as also to be packed with the said camera and the magazine in such a case.

15. In combination, a relatively small sized, self-contained camera and a relatively small sized, self-contained film magazine, both constituting members of a copying camera equipment unit, said camera and magazine having interengaging parts adapting them to be readily attached to each other for use in said unit and readily detached from each other for packing and transportation with the other members of said unit, as in a readily hand-carried case; said magazine having therein film feeding means and said camera having a shutter and lens; a single flexible means for the manual application of pull or presure operatively connected to the film feeding means in the magazine and also operatively related to the said shutter in the camera, so as thereby to feed said film and to operate the shutter by each one of a series of impulses of manual power; said single flexible means being readily disconnectible from at least one of said members (namely, the camera or magazine), so that the camera and the magazine may be readily detached from each other for packing; a knockdown standard to support detachably said camera and magazine and itself adapted to be packed in said case, said case being adapted to be used as a platen or work table with the standard removably mounted thereon.

16. In combination, a relatively small sized, self-contained camera and a relatively small sized, self-contained film magazine, both constituting members of a copying camera equipment unit, said camera and magazine having interengaging parts adapting them to be readily attached to each other for use in said unit and readily detached from each other for packing and transportation with the other members of the said unit, as in a readily hand-carried case; said magazine having therein film feeding means and said camera having a shutter and lens; a single flexible means for the manual application of pull or pressure operatively connected to the film feeding means in the magazine and also operatively related to the said shutter in the camera, so as thereby to feed said film and to operate the shutter by each one of a series of impulses of manual power, said single flexible means being readily disconnectible from at least one of said members (namely, the camera or magazine), so that the camera and the magazine may be readily detached from each other for packing; a standard to support the camera and magazine to and from which they are readily detachable, said standard being of such construction as also to be packed with the said camera and the magazine in such a case, and lighting means constructed and adapted to be detachably supported upon said standard and also adapted to be packed in said case with the other enumerated parts.

17. In combination, a readily hand-carried case, a relatively small sized, self-contained camera and a relatively small sized, self-contained magazine, both constituting members of a copying camera equipment unit, and adapted to be packed and carried in said case; said magazine having therein film feeding means and said camera having a shutter and lens; a single flexible means for the manual application of pull or pressure in each one of a series consisting of an unlimited number of impulses, said means being operatively connected to the film feeding means in the magazine and also operatively related to the said shutter in the camera, so as thereby to feed said film and to operate said shutter in each one of said impulses, the construction of said single flexible means and its connection to the camera and magazine being such that said camera and said magazine and also said single flexible means may be packed in said case for ready hand-carrying.

18. In combination, a readily hand-carried case, a relatively small sized, self-contained camera and a relatively small sized self-contained magazine, both constituting members of a copying camera equipment unit and adapted to be packed and carried in said case, said magazine having therein film feeding means and said camera having a shutter and lens; a single flexible means for the manual application of pull or pressure in each one of a series consisting of an unlimited number of impulses, said means being operatively connected to the film feeding means in the magazine and also operatively related to the said shutter in the camera, so as thereby to feed said film and to operate said shutter in each one of said impulses, the construction being such that the shutter is operated only when the film is stationary, the construction of said single flexible means and its connection to the camera and magazine being such that said camera and said magazine and also said single flexible means may be packed in said case for ready hand-carrying.

19. A copying camera equipment unit adapted for ready assembling and disassembling and adapted to be readily carried in packed, disassembled condition in a readily hand-carried case, comprising a self-contained camera with shutter complete in itself and itself adapted for separate photographic use; said camera having a casing including front and back walls, the back wall having a readily removable part; a film magazine adapted to be removably applied to the back portion of said camera in substitution for said readily removable part, the said magazine for that purpose having a base-formation by which it may be readily and removably applied to said back wall of the camera in substitution for the said removed part of the back wall; said film magazine having within the same means for feeding the film and adapted to be manually operated intermittently; a single flexible means exterior to the camera for the manual application of pull or pressure in impulses operatively associated with said film feeding means and the shutter of the camera and adapted by each one of a series impulses of pull or pressure to operate both film feed and shutter, and adapted upon separation of the camera and magazine to be packed with them in said case; a standard whereon said camera with said applied magazine are adapted to be removably mounted; and a readily portable case, said case being adapted to receive therein for transportation said equipment unit parts.

20. In a photographic apparatus, a camera having a shutter, a film package magazine adapted to be used with the camera, feeding means to feed the film in functioning relation to the lens of the camera, a cable-like manual-power member extending exteriorly of the camera and magazine and adapted to be completely operated to transmit manual power in each one of a series of separate pull or pressure impulses of unlimited number, said member being operatively connected to the film feeding means and operatively associated with said shutter to operate both of them by manual power by each one of said impulses, and including means whereby said shutter is operated by manual power only when the film is at rest, the relation and arrangement of the said parts being such that each one of said impulses of manual power causes the operation of said film feeding means to feed film and also causes the operation of said shutter.

21. In a photographic apparatus, a camera having a shutter, a film package magazine adapted to be used with the camera, feeding means to feed the film in functioning relation to the lens of the camera and including means to vary the length of film fed at each impulse of manual-power transmission, a cable-like manual-power member extending exteriorly of the camera and magazine and adapted to be completely operated to transmit manual power in each one of a series of separate pull or pressure impulses of limited number, said member being operatively connected to the film feeding means and operatively associated with said shutter to operate both of them by manual power by each one of said impulses, the relation and arrangement of the said parts being such that each one of said impulses of manual power causes the operation of said film feeding means to feed film and also causes the operation of said shutter.

22. In a photographic apparatus, a camera having a shutter, a film package magazine adapted to be used with the camera, feeding means to feed the film in functioning relation to the lens of the camera and including a film supply spool and a film take-up spool, a cable-like manual-power member extending exteriorly of the camera and magazine and adapted to be completely operated to transmit manual power in each one of a series of separate pull or pressure impulses of limited number, said member being operatively connected to the film feeding means and operatively associated with said shutter to operate both of them by manual power by each one of said impulses, the relation and arrangement of said parts being such that each one of said impulses of manual power causes the operation of said film feeding means to feed film and also causes the operation of said shutter.

23. In a photographic apparatus, a camera having a shutter, a film package magazine adapted to be used with the camera, feeding means to feed the film in functioning relation to the lens of the camera and including a film supply spool, a film measuring roll and a film take-up spool, a cable-like manual-power member extending exteriorly of the camera and magazine and adapted to be completely operated to transmit manual power in each one of a series of separate pull or pressure impulses of limited number, said member being operatively connected to the film feeding means and operatively associated with said shutter to operate both of them by manual power by each one of said impulses, the relation and arrangement of the said parts being such that each one of said impulses of manual power causes the operation of said film feeding means to feed film and also causes the operation of said shutter.

24. In a photographic apparatus, a camera having a shutter, a film package magazine adapted to be used with the camera, feeding means to feed the film in functioning relation to the lens of the camera, a cable-like manual-power member extending exteriorly of the camera and magazine and adapted to be completely operated to transmit manual power in each one of a series of separate pull or pressure impulses of unlimited number, said member being operatively connected to the film feeding means and operatively associated with said shutter to operate both of them by manual power by each one of said impulses by means including a to and fro movable member, movement of which in one direction by an impulse of manual-power transmission causes the film to be fed and movement of which in the opposite direction permits shutter operation, the relation and arrangement of the said parts being such that each one of said impulses of manual power causes the operation of said film feeding means to feed film and also causes the operation of said shutter.

25. In a photographic apparatus, a camera having a shutter, a film package magazine adapted to be used with the camera, feeding means to feed the film in functioning relation to the lens of the camera, a cable-like manual-power member extending exteriorly of the camera and magazine and adapted to be completely operated to transmit manual power in each one of a series of separate pull or pressure impulses of unlimited number, said member being operatively connected to the film feeding means and operatively associated with said shutter to operate both of them by manual power by each one of said impulses by means including a to and fro movable member, movement of which in one direction by an impulse of manual-power transmission causes the film to be fed and positions the shutter mechanism for operation, and movement of which in the opposite direction permits shutter operation, the relation and arrangement of the said parts being such that each one of said impulses of manual power causes the operation of said film feeding means to feed film and also causes the operation of said shutter.

26. In a photographic apparatus, a camera having a shutter, a film package magazine adapted to be used with the camera, said camera and magazine being each self-contained and readily attachable and detachable from each other notwithstanding the presence of the cable-like manual-power member, feeding means to feed the film in functioning relation to the lens of the camera, a cable-like manual-power member extending exteriorly of the camera and magazine and adapted to be completely operated to transmit manual power in each one of a series of separate pull or pressure impulses of limited number, said member being operatively connected to the film feeding means and operatively associated with said shutter to operate both of them by manual power by each one of said impulses, the relation and arrangement of the said parts being such that each one of said impulses of manual power causes the operation of said film feeding means to feed film and also causes the operation of said shutter.

27. In a photographic apparatus, a camera having a shutter, a film package magazine adapted to be used with the camera, feeding means to feed the film in functioning relation to the lens of the camera, a cable-like manual-power member extending exteriorly of the camera and magazine and adapted to be completely operated to transmit manual power in each one of a series of separate pull or pressure impulses of unlimited number, said member being operatively connected to the film feeding means and operatively associated with said shutter to operate both of them by manual power by each one of said impulses, by means including one or more over-running clutches, the relation and arrangement of the said parts being such that each one of said impulses of manual power causes the operation of said film feeding means to feed film and also causes the operation of said shutter.

28. In a photographic apparatus, a camera having a shutter, a film package magazine adapted to be used with the camera, feeding means to feed the film in functioning relation to the lens of the camera, a cable-like manual-power member extending exteriorly of the camera and magazine and adapted to be completely operated to transmit manual power in each one of a series of separate pull or pressure impulses of unlimited number, said member being operatively connected to the film feeding means and operatively associated with said shutter to operate both of them by manual power by each one of said impulses, by means including a chain connected to said cable-like member, a sprocket wheel for said chain and a return spring for said chain, the relation and arrangement of said parts being such that each one of said impulses of manual power causes the operation of said film feeding means to feed film and also causes the operation of said shutter.

29. In a photographic apparatus, a camera having a shutter; a film package magazine adapted to be used with the camera; feeding means to feed the film in functioning relation to the lens of the camera; and means for operating both the film feeding means and the shutter through each impulse of a series consisting of an unlimited number of manual push-and-pull impulses of the operator, said means including an elongated, flexible, manual connection by which each said push-or-pull manual impulse of the operator is transmitted both to the film feeding means and to the shutter, said connection having a portion which is exterior to the camera and the magazine and to which the impulses are imparted, said connection being operatively associated both with the film feeding means and the shutter.

30. In combination, in a copying camera equipment unit, a camera and a magazine, said camera having a shutter and lens and said magazine having therein film feeding means; a single, elongated, manual-power transmission member extending exteriorly of the camera and magazine and adapted to have manual power applied thereto in a series of separate impulses of unlimited number and to transmit such manual power by each of said impulses to said film feeding means and shutter so that each such single impulse completely operates said film feeding means and shutter, said member being operatively connected to the film feeding means in the magazine and also operatively related to the said shutter in the camera, so as thereby to feed said film and to operate said shutter by each of said impulses.

EDSON S. HINELINE.